(12) United States Patent
Gillard et al.

(10) Patent No.: US 11,214,130 B2
(45) Date of Patent: Jan. 4, 2022

(54) GLAZING FOR MOTOR VEHICLES

(75) Inventors: Quentin Gillard, Jumet (BE); Renaud Hubert, Jumet (BE); Benoit Lecomte, Jumet (BE); Rostislav Losot, Jumet (BE); Nerio Lucca, Jumet (BE)

(73) Assignee: AGC Glass Europe, Louvain-la-Neuve (BE)

( * ) Notice: Subject to any disclaimer, the term of this patent is extended or adjusted under 35 U.S.C. 154(b) by 0 days.

(21) Appl. No.: 14/130,787

(22) PCT Filed: Jun. 18, 2012

(86) PCT No.: PCT/EP2012/061557
§ 371 (c)(1),
(2), (4) Date: Jan. 3, 2014

(87) PCT Pub. No.: WO2013/004473
PCT Pub. Date: Jan. 10, 2013

(65) Prior Publication Data
US 2014/0141206 A1 May 22, 2014

(30) Foreign Application Priority Data
Jul. 4, 2011 (BE) .................................. 2011/0415

(51) Int. Cl.
*B60J 1/00* (2006.01)
*B32B 17/10* (2006.01)

(52) U.S. Cl.
CPC ......... *B60J 1/008* (2013.01); *B32B 17/10036* (2013.01); *B32B 17/10761* (2013.01);
(Continued)

(58) Field of Classification Search
CPC ................ B60J 1/00; Y10T 428/24628; Y10T 428/2495; B32B 2605/006;
(Continued)

(56) References Cited

U.S. PATENT DOCUMENTS 3,801,423 A * 4/1974 Van Laethem ... B32B 17/10018
428/155
4,139,359 A * 2/1979 Johnson .............. C03B 23/0254
65/104
(Continued)

FOREIGN PATENT DOCUMENTS

DE 10 2009 017 805 10/2010
EP 0 895 853 2/1999
(Continued)

OTHER PUBLICATIONS

International Search Report dated Sep. 13, 2012 in PCT/EP12/061557 Filed Jun. 18, 2012.

*Primary Examiner* — Frank J Vineis
*Assistant Examiner* — Laura B Figg
(74) *Attorney, Agent, or Firm* — Oblon, McClelland, Maier & Neustadt, L.L.P.

(57) ABSTRACT

The invention relates to a laminated glass panel for an automobile, having a curved shape resulting from the assembly of a first glass sheet, which is curved before said assembly, with an intermediate thermoplastic sheet and a second glass sheet, the thickness of which does not exceed one third of that of the first sheet, the second glass sheet not being curved, or having a curvature that is substantially smaller than that of the first sheet before the assembly thereof with the latter and the intermediate thermoplastic sheet.

15 Claims, 3 Drawing Sheets

(52) U.S. Cl.
CPC .. *B32B 17/10816* (2013.01); *B32B 17/10889* (2013.01); *Y10T 428/24628* (2015.01)

(58) Field of Classification Search
CPC ........ B32B 17/10036; B32B 17/10091; B32B 17/10119; B32B 17/10137; B32B 17/10761
USPC ........................................................ 428/174
See application file for complete search history.

(56) References Cited

U.S. PATENT DOCUMENTS

| | | | |
|---|---|---|---|
| 4,643,944 A * | 2/1987 | Agethen | ........... B32B 17/10018 428/349 |
| 6,086,983 A * | 7/2000 | Yoshizawa | .................... 428/215 |
| 6,582,799 B1 | 6/2003 | Brown et al. | |
| 2012/0025559 A1 * | 2/2012 | Offermann et al. | ......... 296/84.1 |

FOREIGN PATENT DOCUMENTS

| | | | |
|---|---|---|---|
| GB | 2 011 316 | | 7/1979 |
| GB | 2011316 A | * | 7/1979 |
| GB | 2 078 169 | | 1/1982 |
| WO | 00 73062 | | 12/2000 |

\* cited by examiner

GLAZING FOR MOTOR VEHICLES

The invention relates to a curved laminated glazing for motor vehicles.

Car manufacturers are increasingly demanding lighter glazing units. The reduction in weight of the glazing units is the effect of reductions in thickness of the glass sheets that form them. The choice of lighter glazing units does not change the requirements as regards the qualities of these glazing units, whether these relate to mechanical strength or optical qualities.

At the same time, the manufacturers propose models, in which the glazing offers new properties or where the glazed areas are increased in size. The presence of glazed roofs is an example of these trends. Laminated structures are also proposed for all the glazing units in particular for reasons of acoustic comfort or for protection against break-in.

The substitution of laminated glazing units for monolithic glazing units such as those traditionally used for side windows or rear windows leads to the search for assemblies of glass sheets with relatively small thicknesses. These glazing units are mostly formed from sheets of toughened glass with a thickness in the order of 4 mm. The replacement of these monolithic sheets by laminated assemblies results in the use of glass sheets with thicknesses of mostly less than 3 mm. This reduction is all the more necessary when the laminated assemblies comprise a thermoplastic interlayer sheet, which adds to the thickness of the assembly, and one of the questions raised in this substitution idea is to also provide the laminated option in parallel with that of the monolithic glazing in the same model without modifying the elements, in which these glazing units are integrated, in particular the slide rails of movable side windows.

The formation of laminated glazing units of low thickness raises some questions in particular when the glazing units have to be bent.

The techniques that include a heat treatment, whether this is a bending or toughening operation for glass sheets of low thickness, are likely to impose particular measures to ensure that satisfactory properties are maintained, optical properties in particular but also mechanical properties. For example, thermal toughening of the sheets is a much more delicate operation when the glass sheet is thin. Bending sheets, in particular bending two sheets simultaneously, also raises specific problems particularly when the two sheets have different thicknesses.

The aim of the invention is to enable laminated and curved glazing units with a low thickness to be obtained that also have all the mechanical or optical properties required by the car manufacturers, in particular to meet the standards in this field. The set aim must be achieved without necessitating costly treatments or those where the yields would be inadequate.

The prior art includes a large number of techniques dedicated to the production of curved laminated glazing units. In the most widespread techniques, starting from superposed plane sheets, the bending operation is conducted on both sheets simultaneously. In these techniques, the traditional methods used endeavour to ensure as far as possible that during the bending operation the two superposed sheets are in conditions that are as similar as possible. This is achieved in particular by controlling the temperature of these sheets when they are deformed, whether by gravity or by pressing, or even a combination of these two methods.

The previous techniques relating to simultaneous bending of the two sheets have shown that the complexity increased when the paired sheets differed from one another, whether with respect to thickness, composition of the glass, the possible presence of associated elements such as enamelled parts or even the presence of functional layers.

Patent EP 1 200 255 discusses this type of difficulty, in particular for assemblies that include the presence of layers that modify the behaviour of the sheets during a thermal treatment. This publication relates to relatively thick glass sheets and the essence of its instruction relates to the control of the temperature of each sheet during the bending operation.

To take into consideration the difficulties encountered in these techniques including the simultaneous bending of two sheets, or also to minimise the production costs, other techniques are also known from the prior art, in particular those in which the two sheets are bent separately. This type of operation is not without its difficulties. The pairing of sheets often reveals that the shapes obtained are not strictly the same, and this poses problems during assembly and ultimately for the optical properties of these glazing units.

The invention proposes the production methods for curved laminated glazing units disclosed in claim 1.

To form these laminated glazing units of low thickness the invention proposes as one of its principles to assemble two glass sheets of different thickness, which also have different shapes before assembly, wherein the previously bent thickest sheet predominantly determines the final shape of the assembly. In other words, in the operation for assembly of the two sheets leading to the final laminated glazing, the thinnest sheet undergoes a deformation operation that substantially moulds it to the shape of the thicker sheet. In this operation the thick sheet can also undergo some modification in its shape, but this is very limited and sufficiently reduced so that the shape of the final laminated glazing can be assimilated to that of the thick sheet before its assembly.

To reach this result, it is necessary that the mechanical bending strength characteristics of the two sheets are sufficiently different. The thickness of the sheets predominantly determines the bending behaviour. For the thicker sheet to be able to impose its shape, its thickness is several times that of the thinner sheet. According to the invention, the ratio of the thicknesses is at least 3:1 and preferably 4:1. The higher this ratio is, the closer the curve of this laminated glazing conforms to that of the thicker sheet.

For the choice of technique in particular for the production of glazing units with thicknesses that are not greater than those of previous monolithic glazing units, the thickness of the laminated glazing units according to the invention is essentially in the order of 4 mm at most, that is including the thickness of the thermoplastic interlayer sheet.

The thermoplastic sheets used are traditional sheets. Thus, this mostly relates to a polyvinyl butyral sheet (PVB) commercially available in thicknesses of 0.38 or 0.76 mm. The formation of the glazing units according to the invention does not require specific thicknesses. Combinations of several sheets are also possible. However, in practice, the most frequent choice will be to use the available sheets, possibly after these have undergone a drawing operation using practices known in this field. In practice, the preference is to use an interlayer sheet with a thickness not greater than 0.8 mm, whatever the nature of this sheet.

On the basis of the above, in the glazing units according to the invention the combined thicknesses of the two glass sheets advantageously does not exceed 3.7 mm. This combined thickness is mostly less than 3.2 mm and preferably less than 2.8 mm.

As a result of the conditions indicated above, the second glass sheet, which must undergo a significant deformation during assembly, is necessarily relatively thin. The thinner it is, the easier the shaping.

To benefit from the advantages associated with the reduction in thickness, it is preferred to choose the second sheet with a thickness at most equal to 0.8 mm and preferably at most equal to 0.6 mm. Sheets as thin as 0.4 are also well suited to the products according to the invention.

The production conditions and the subsequent conditions of use of very thin layers constitute a limit to the reduction in thickness. The thin sheets of the laminated glazing units according to the invention have a thickness that is advantageously not less than 0.1 mm and preferably not less than 0.2 mm.

However, in the case of the thickest sheet of the laminated structure, its thickness remains limited so as not to compromise the benefit of reducing the weight of the assembly. This sheet preferably does not have a thickness of more than 3.2 mm and particularly preferred not more than 2.1 mm. For the laminated glazing units with the lowest thickness, the "thick" sheet can be as thin as 1.6 mm or even less, in particular 1.2 mm.

Apart from the thickness of the sheets, the difference in their shapes before assembly is also a determining factor for providing a glazing unit that will be stable in quality over time. The stresses introduced into the sheets must in fact remain within the limits that the laminated glazing unit can withstand without risk of subsequent modification or without impairing the properties of the glazing units, in particular the mechanical properties.

The stresses applied firstly concern the second sheet which undergoes the most significant deformation. The stresses that can be withstood without risk of fault in the laminated assembly are also dependent on the thickness of the sheets. The smaller the thickness of the second sheet, the more flexible the sheets are and the greater the deformation caused, and therefore the surface stresses generated can be significant.

The maximum stresses that can be applied to a glass sheet as a function of the uniform bending undergone are expressed as follows:

$$\sigma = E.h/2.R(1-n^2)$$

in which h is the thickness of the sheet, R the radius of curvature, E is the Young's modulus (in practice 72 GPa for glass) and n is the Poisson's coefficient (in practice 0.22).

Working from this equation, the radius of curvature that can be applied to the sheet is deduced for each thickness and for a stress that it is essential not to exceed. The choice of the surface stresses that must be adhered to depends on the methods of use. In particular, a distinction must be made between the permanent stresses, i.e. as their name suggests, those that are present all the time in the sheet, and the momentary stresses. The latter are those that result from additional deformations. In the case of vehicles, these are the consequence of the limited deformability of the passenger compartment as a function of the situation of the vehicle. The permanent stresses are those that impose the limits in the present case. They are necessarily lower than the momentary stresses that the sheet can withstand.

In practice, the surface stresses that one endeavours not to exceed for the second sheet are advantageously 50 MPa, preferably 30 MPa.

The examples given below show what curvatures relating to the thickness of the sheets correspond to these choices.

The limits in the assembly conditions can also be expressed in relation to the curvatures imposed on the glazing units. The significance of the curvatures imposed taking into account the thicknesses of the sheets forms another approach for the conditions that should preferably be adhered to in the production of the glazing units according to the invention.

Advantageously, the curvatures of the first sheet must not have a radius of less than 1 m, preferably not less than 1.5 m.

Moreover, the possible curvatures take into account the deformation that can be withstood by the second sheet. If this second sheet is not plane, but is itself initially curved, the final curvature can be more accentuated and the resulting deformation remains limited. For the glazing units according to the invention the ratio of the smallest radii of curvature of the second sheet, $R_2$, to those of the first sheet, $R_1$, is advantageously such that $R_2/R_1>2$ and preferably $R_2/R_1>10$. The ratio is infinite when, in the preferred case, the second sheet is plane.

With respect to the mechanical strength of the sheets, one must also take into consideration the fragility that can originate from the edges of the sheets. The presence of microcracks at the edges of the glass sheets is known to generate fractures if no measures are taken to stabilise these. The most usual method to reduce or eliminate these cracks in monolithic sheets of the prior art is to conduct a careful "grinding" of the edges. The grinding of the edges of the thinnest sheets is a delicate operation because of their fragility. If the grinding cannot be conducted or cannot be sufficient to protect the sheets, in particular the thin sheets, prevention of the commencement of fracture is advantageously achieved or completed by introducing compression stresses into the edges of the sheets.

In the case of the monolithic, and therefore relatively thick, glazing units of the prior art, the prevention of fractures starting from the edges is achieved mostly by a thermal toughening operation.

The thermal toughening of thin sheets is a difficult operation. The thermal inertia is reduced so that it is difficult to maintain an adequate temperature in the thickness of the sheet. When this thermal toughening is too delicate an operation for the thin sheets, the toughening for the second sheet in particular is advantageously conducted chemically using traditional techniques. In these techniques the aim is to substitute constituents such as sodium with elements of greater volume such as potassium.

The techniques of assembling the sheets must include a pressure exerted onto the superposed sheets, between which the thermoplastic interlayer sheet has been placed, and an increase in temperature leading to the adhesion of the thermoplastic sheet to the two glass sheets. To assure contact between the three superposed elements, it is advantageous to apply a vacuum between the two glass sheets so that the external pressure is exerted uniformly on the entire surface of these two sheets.

According to the traditional implementation techniques, the vacuum can be obtained in an airtight flexible envelope of material, in which the assembly of the elements of the glazing is positioned. In this case the pressure is exerted by means of the envelope in question. It is also possible, likewise in a known manner, to arrange a ring to cover only the periphery of the glazing.

Whatever method is used to assure the pressure on the assembly to be laminated, this pressure must be sufficient to apply the two glass sheets firmly against one another with the thermoplastic sheet between them.

When the sheets are thus pressed against one another, the temperature is brought to a level that renders the thermoplastic material adherent by contact with the glass. The temperature remains limited so as not to lead to an excessive softening of the thermoplastic material. In the case of polyvinyl butyral, which constitutes the most usual thermoplastic material, the temperature is in the order of 100 to 120° C.

Subsequent to the step leading to the adhesion of the glass sheets by means of the thermoplastic sheet, the laminated glazing is usually insufficiently transparent. The subsequent treatment consists of passage through an oven under pressure and at a higher temperature than that previously applied for the adhesion. In the case of a polyvinyl butyral interlayer, the temperature reached increases to about 140° C., for example.

The production methods for the laminated glazing units according to the invention can be applied to all glasses customarily used to form automotive glazing units. These are clear glasses, but also coloured glasses, i.e. glasses with a very low light transmission such as glasses referred to as "privacy" glasses.

The glasses used in the laminated structure are either identical or different. As indicated in the introduction, an advantage of the considered technique is to provide possibilities for pairing sheets that in traditional simultaneous bending techniques would not readily lead to shapes that can be perfectly superposed.

It is also possible according to the invention to cover one or other of the two sheets, or both sheets, with functional layers. These are usually layers of enamel, for example, for masking elements that are not aesthetically pleasing, such as beads of glue for securing these glazing units. Above all, these are functional layers that provide the glazing with infrared reflective properties to ensure thermal comfort inside the vehicle.

Layer systems that selectively reflect infrared rays are known to be relatively fragile at the temperatures required for bending that lie at about 650-700° C. A potential advantage of the glazing units according to the invention is to allow curved glazing units to be obtained without the sheet to which the layer system is applied being subjected to these elevated temperatures. For this, it is selected to apply the layer system to the thin layer that is preferably only bent by the deformation performed during the course of the assembly.

The glazing units according to the invention can additionally include interlayer components comprising functional elements otherwise known. These are, for example, interlayers comprising photovoltaic cells or elements that are electrically controlled to modify the features of light transmission: electrochromic elements, suspended particles . . . .

Other functions are also associated with the nature of the interlayer. In particular, the glazing units can be configured by integrating an interlayer that has sound absorption properties. These interlayers can compensate in particular at least for part of the reduction in thickness of the glass sheets with their contribution to this sound absorption.

The invention is described in detail below with reference to the sets of figures, wherein.

Figure 5:
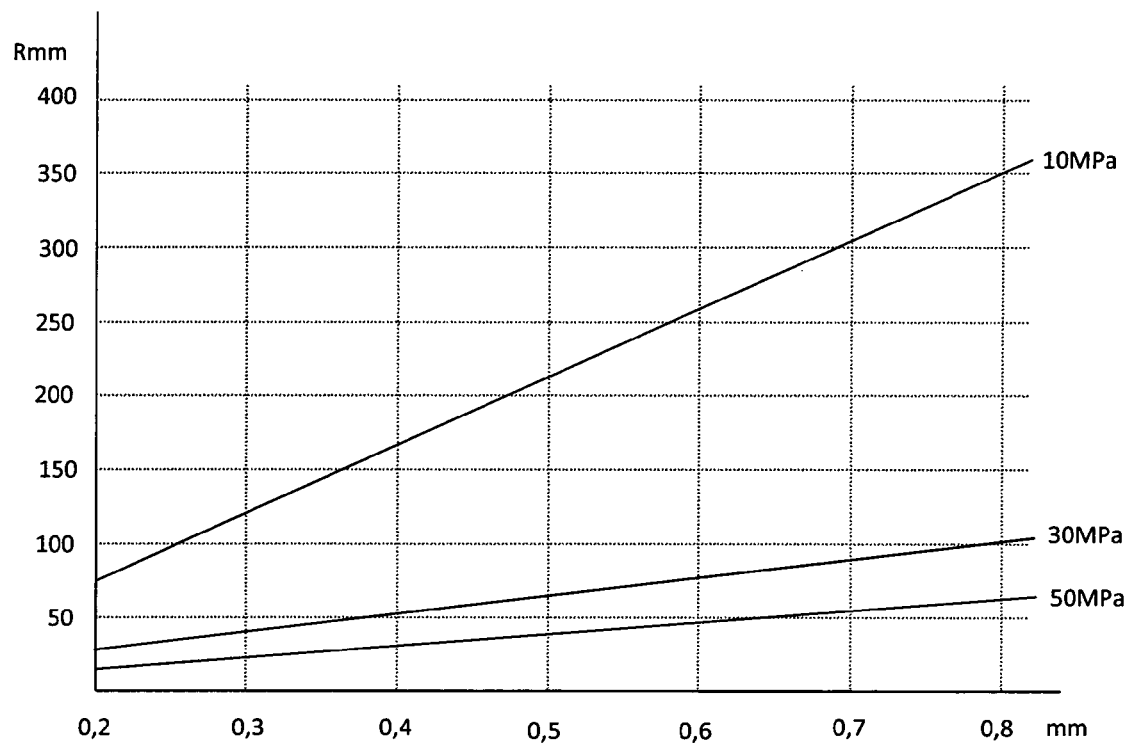

FIG. 5 gives the example of the ratio of radius of curvature to thickness for three levels of corresponding stresses.

Figure 1A:
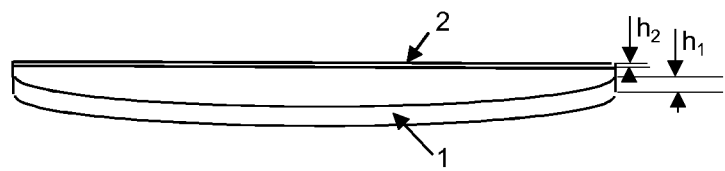
FIG. 1 is a diagram showing the principle of the implementation of the invention.

FIG. 1a shows the principle of the combination of two glass sheets according to the invention. A glass sheet 1 is initially bent in a usual technique for bending a single sheet. This bending can be achieved by pressing, by gravity or a combination of pressing and gravity.

A glass sheet 2 has a substantially gentler curvature, or better is plane.

The two sheets have substantially identical dimensions so that once they are assembled, their edges are contiguous. This arrangement, which is not represented precisely, means that when the sheets are superposed the plane, or almost plane, sheet 2 projects very slightly in relation to the initially bent sheet 1. The diagram exaggerates the differences in shape for the purposes of understanding. In practice, since the curvatures are relatively gentle, the initial overlap remains very small, which allows an adequate final assembly edge to edge.

As indicated, to enable sheet 2 to be consistent with sheet 1, their respective thicknesses are very different, wherein sheet 2 has to undergo a mechanical deformation operation utilising its flexibility, and has a small thickness compared to that of sheet 1, which is necessarily more rigid. The deformation of sheet 2 is achieved during assembly by pressure exerted onto the outside faces of the two sheets.

Figure 1B:
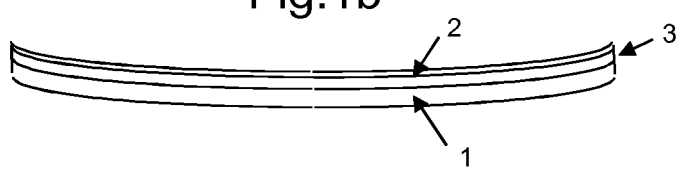

In FIG. 1b the final assembly comprises, in addition to the two glass sheets, a thermoplastic interlayer sheet 3 of the type traditionally used in laminated glazing units.

The method of composition of the glazing units according to the invention, which is based on differences in rigidity of the sheets necessarily leads to a curvature that progresses in an essentially "cylindrical" manner, i.e. in a single direction, as opposed to a "spherical" curvature that progresses in two directions. Any spherical curvature involves an "extension" in the plane of the glass sheet, which extension only being possible during the softening at elevated temperature. When cold, glass sheets do not have the elasticity that would allow a significant spherical bending. For this reason, the figures show glass sheets curved in a single direction.

The assembled sheets have very different thicknesses. Assemblies that respond satisfactorily in terms of optical quality are obtained, for example, by assembling glass of 0.9 mm and 3.8 mm, but this type of assembly is primarily of interest in forming laminated structures of very small thickness. By way of example, glazing units formed with a sheet of 0.4 mm and a sheet of 1.6 mm are of particular interest. In association with an interlayer sheet of 0.76 mm, they have a total thickness of 2.76 mm and are lighter than the traditional monolithic glazing units of a greater thickness.

Compared to these monolithic glazing units, the glazing units according to the invention additionally provide advantageous mechanical characteristics. In this type of assembly the anti-intrusion characteristics are added by the presence of the thermoplastic sheet. Moreover, as known, impact tests referred to as the "gravel test" show a better resistance by virtue of the assembly of two sheets of different thicknesses.

Figure 2:
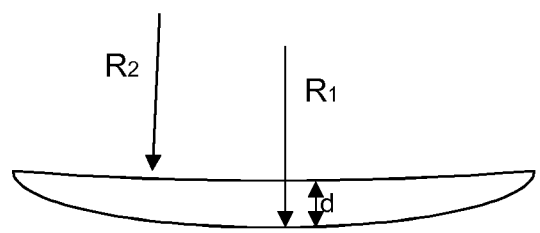
FIG. 2 is a diagram in which the dimensional elements of the glazing units according to the invention are illustrated.

FIG. 2 schematically shows the structural parameters associated with the laminated glazing units according to the invention besides those relating to the thicknesses $h_1$ and $h_2$ shown in FIG. 1a. The radii of curvature $R_1$ and $R_2$ are shown with the greatest distance d existing between the sheets before their assembly. In the most usual case according to the invention sheet 2 is plane, the radius $R_2$ is infinite.

Figure 3:
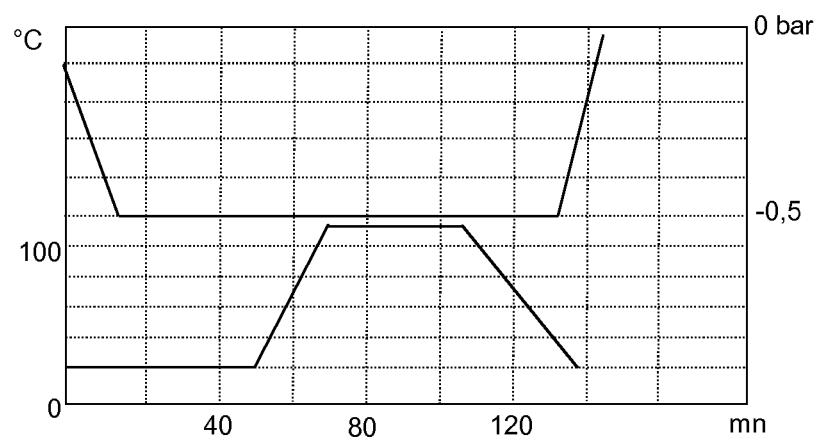
FIG. 3 is a graph of the first step of a cycle of the assembly of the glazing units according to the invention.
Figure 4:
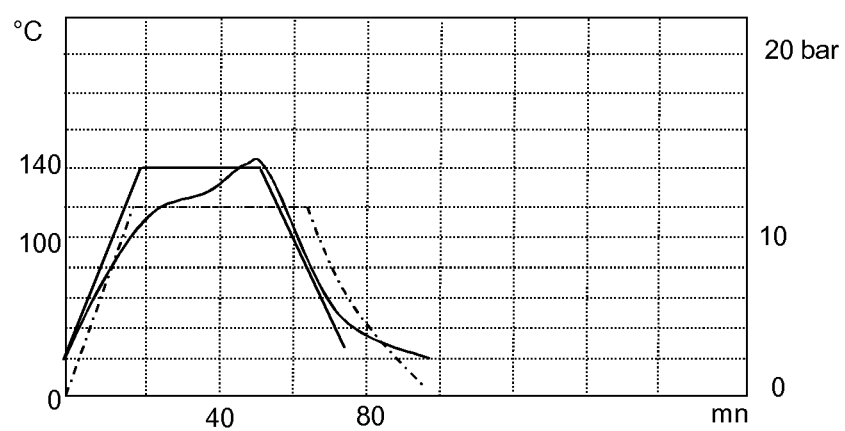
FIG. 4 is a graph of a second step of a cycle of the assembly of the glazing units according to the invention.

The assembly of the sheets comprises two steps, the conditions of implementation of which are shown in FIGS. 3 and 4.

The first step that takes the sheets to an assembly of the structural elements of glass sheets and thermoplastic interlayer comprises placement under pressure and the elevation of temperature.

FIG. 3 indicates the development in time expressed in minutes of the pressure exerted in bar and the temperature. The pressure is expressed negatively to illustrate the fact that a relative vacuum is formed, which allows not only the pressure to be exerted on the sheets by means of the envelopes in which they are placed, but at the same time enables elimination of the air present between these sheets.

Low pressure is exerted throughout the operation and is only relaxed after the temperature is brought back to ambient temperature, wherein the thermoplastic interlayer is then perfectly stabilised after the necessary softening time for adhesion of the glass sheets. This adhesion occurs in the phase corresponding to the temperature level in the order of 110° C. for a polyvinyl butyral interlayer.

During this first step the low pressure presses the sheets against one another, the less rigid sheet 2 moulding to the shape of sheet 2. The interlayer does not pose any resistance to this shaping operation which is much easier when sheet 2 is less thick and therefore more flexible.

At the end of the adhesion step, the sheets are well secured. The laminated glazing unit also requires an oven stage under pressure which provides it with its final transparency. In fact, after adhesion the glazing units also has a haze due to the adhesion not being perfectly uniform between the surfaces of the glass sheets and those of the interlayer. The oven at a higher temperature, e.g. 140° C., and at a pressure of 12 bar for a PVB interlayer enables the light transmission to be increased. During the oven stage the assembly must be held under pressure to prevent delamination.

FIG. 4 shows the desired oven temperature (straight lines) and the temperature of the glazing (curved line). The pressure is represented by broken lines.

FIG. 5 shows the relation existing between the thickness of the second sheet and the radius of curvature imposed on it during assembly. The graph shows this relationship when a surface stress is set that is not to be exceeded. As an indication, three stress values are shown: 10 MPa, 20 MPa and 50 MPa.

This graph shows very clearly that the radius of curvature for the same thickness is greatly dependent on the acceptable stress level. As an indication, for a sheet 0.4 mm thick, if a stress of 50 MPa is accepted, the radius of curvature can be as small as 300 mm. If the stress must not exceed 10 MPa, the radius of curvature must not be less than 1500 mm.

If the thickness of the sheet increases, the acceptable radii of curvature are also more significant. In other words, to be able to provide the sheets with a relatively small radius of curvature, it is necessary to choose sheets with as small a thickness as possible.

The advantage of using a very thin second sheet is also found in the noted modifications to the final glazing in relation to the initial curvature of the previously bent sheet. Measurements of maximum deformation existing between the initial shape and that corresponding to the assembly?

As an indication, for sheets extending over 50 cm in the direction of curvature and a largest initial spacing (d FIG. 2) between the two sheets and depending on the respective sheet thicknesses, a variation is noted as follows:

sheet 1 1.6 mm; d 8.5 mm; sheet 2 0.4 mm; modification after assembly about 1 mm;

sheet 2 3.8 mm, d 12.3 mm; sheet 2 0.4 mm; modification after assembly about 0.4 mm.

As predictable, the modification is less perceptible when sheet 1 is thicker. These values correspond to relatively significant curvatures. Naturally, the choice of sheets and the initial curvature of sheet 1 must take into account these modifications in the production of glazing units with the dimensions required by the manufacturers.

Tests have also been conducted to verify impact resistance. In practice, the "gravel test" consists of dropping a ball onto the glazing from increasing height. The height, at which the sheet onto which the ball falls is broken, is established. According to the requirements of the manufacturers and for the side windows the impact under consideration will be on the sheet directed towards the passenger compartment. In these conditions the impact is therefore on the thin sheet under stress. In sheet 1/sheet 2 assemblies of 1.6/0.4 mm, since the thin sheet is toughened, the determined heights are equivalent to those corresponding to those observed for monolithic glazing units.

The invention claimed is:

1. A laminated curved automotive glazing assembly, comprising:
    a first glass sheet initially curved in this assembly,
    a thermoplastic interlayer sheet, and
    a second glass sheet with a thickness that is not greater than a third of that of the first sheet,
    wherein the second glass sheet does not have a curvature, or has a curvature that is less than that of the first sheet, before its assembly with the first glass sheet and the thermoplastic interlayer sheet,
    wherein in the assembly the second glass sheet has a surface stress that is not more than 50 MPa, and
    wherein a total thickness of the first glass sheet, thermoplastic interlayer, and second glass sheet is not more than 2.8 mm.

2. The glazing according to claim 1, wherein the first glass sheet has a thickness that is not more than 2.1 mm.

3. The glazing according to claim 1, wherein the thickness of the second glass sheet is not more than 0.8 mm.

4. The glazing according to claim 1, wherein the thickness of the second sheet is not less than 0.2 mm.

5. The glazing according to claim 1, wherein the curvature of the first glass sheet is cylindrical and a radius of curvature is not less than 1 m.

6. The glazing according to claim 1, wherein the second glass sheet is not curved before assembly.

7. The glazing according to claim 1, wherein the interlayer sheet has a thickness that is not more than 0.8 mm.

8. The glazing according to claim 1, wherein at least the second glass sheet is chemically toughened.

9. The glazing according to claim 1, wherein the second glass sheet bears a system of functional layers and the system of layers comprises a layer system for filtering infrared rays on a face in contact with the thermoplastic interlayer.

10. The glazing according to claim 1, forming a side window of a motor vehicle.

11. The glazing according to claim 1, wherein the thickness of the second glass sheet is not greater than a fourth of that of the first glass sheet.

12. The glazing according to claim 1, wherein in the assembly the surface stress of the second glass sheet is not more than 30 MPa.

13. The glazing according to claim 1, wherein in the assembly the surface stress of the second glass sheet is not more than 20 MPa.

14. The glazing according to claim 1, wherein in the assembly the surface stress of the second glass sheet is not more than 10 MPa.

15. The glazing according to claim 1, wherein the curvature of the first glass sheet is cylindrical and a radius of curvature is not less than 1.5 m.

\* \* \* \* \*